Dec. 28, 1948.  F. W. BAUMANN  2,457,517
ALTERNATING CURRENT COMMUTATOR MACHINE
Filed Aug. 23, 1947
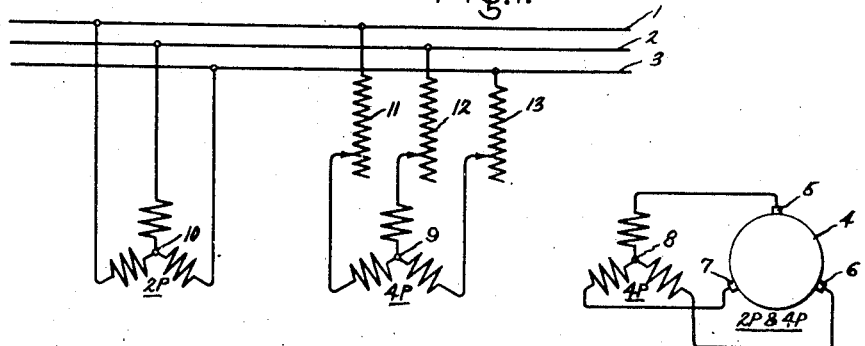
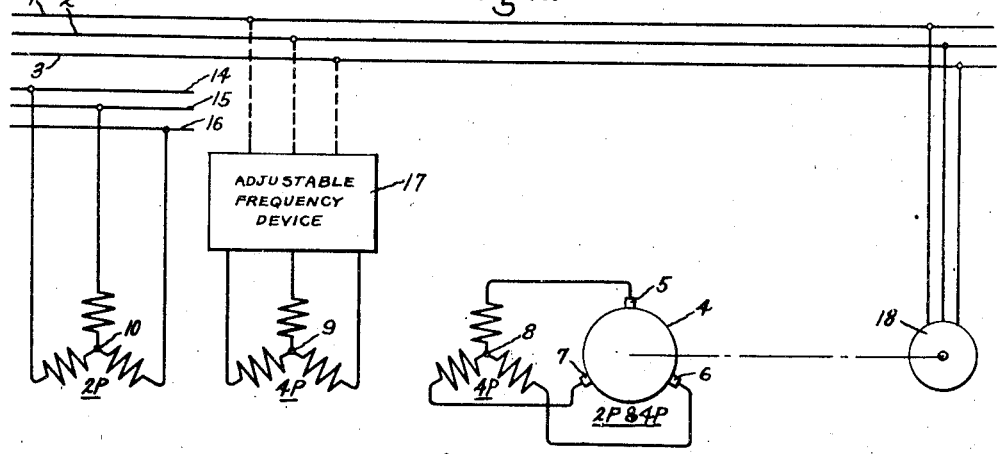
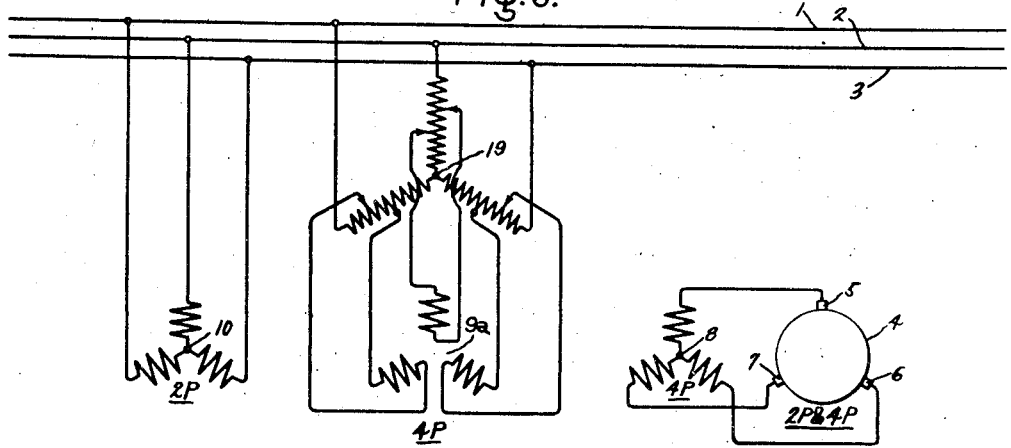
Inventor:
Frederick W. Baumann,
by His Attorney.

Dec. 28, 1948. F. W. BAUMANN 2,457,517
ALTERNATING CURRENT COMMUTATOR MACHINE
Filed Aug. 23, 1947 2 Sheets-Sheet 2
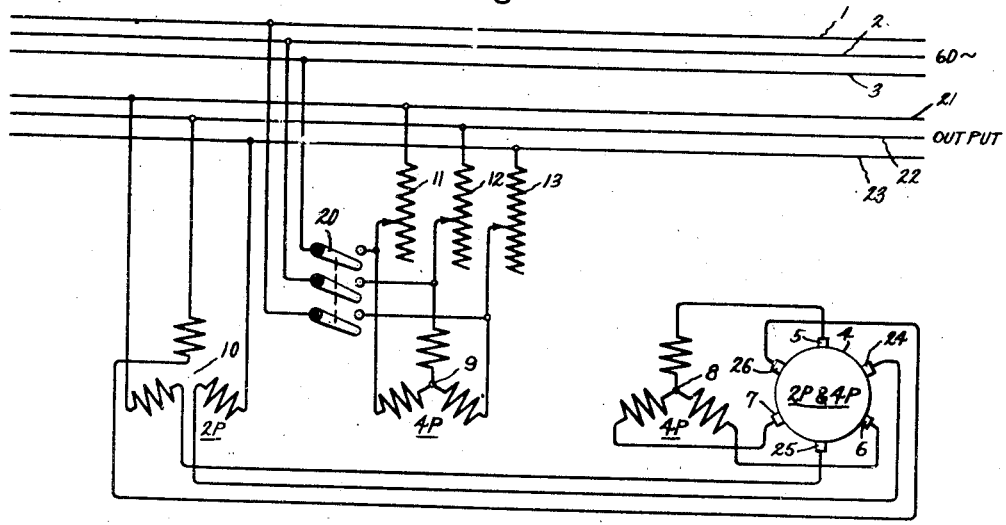
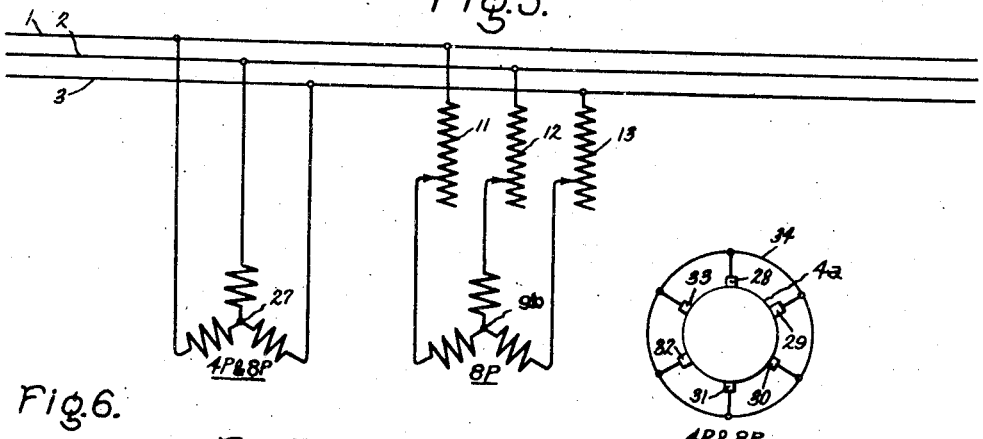
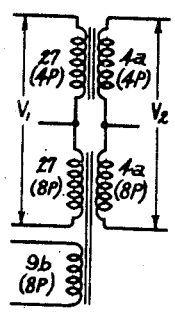
Inventor:
Frederick W. Baumann,
by His Attorney.

Patented Dec. 28, 1948

2,457,517

UNITED STATES PATENT OFFICE 2,457,517

ALTERNATING CURRENT COMMUTATOR MACHINE

Frederick W. Baumann, Schenectady, N. Y., assignor to General Electric Company, a corporation of New York Application August 23, 1947, Serial No. 770,242

10 Claims. (Cl. 318—244)

My invention relates to an improvement in dynamoelectric machines and more specifically to a dynamoelectric machine of the alternating-current type which may be operated as an adjustable speed motor or as an adjustable frequency generator.

As is well known, it is cheaper and more efficient to transmit and utilize electric power when so-called alternating currents are employed, but rotating dynamoelectric machines of the type adapted to be used on alternating-current systems usually lack the readily controllable flexibility of similar machines adapted to operate in conjunction with direct-current power systems.

Heretofore means such as complicated control for inserting resistance in the electrical circuit of the stator or rotor windings, or for relatively shifting the mechanical position of commutating brushes, have been used in an effort to make alternating-current machinery adaptable to the great class of work conventionally performed by direct-current machines. However, such methods have presented disadvantages, among which have been the complexity and expense of construction, maintenance, and operation of the requisite accessory equipment.

It is an object of this invention to provide simple and inexpensive means for overcoming these difficulties and for achieving a high degree of flexibility in rotating machines adapted to operate in conjunction with alternating-current power systems.

My invention is particularly directed to the provision of a dynamoelectric machine of the asynchronous type (wherein the windings of both stator and rotor members are traversed by alternating current) which has a high degree of flexibility in operation.

Broadly the means employed in the embodiments herein illustrated and described comprise a dynamoelectric machine having a rotor winding to which a bucking or boosting voltage is applied through magnetic coupling with one or more stator windings. More particularly the means employed in the embodiments illustrated and described in this application comprise a dynamoelectric machine having a plurality of stator windings which are so wound as to have a different number of poles. These windings are inductively coupled to a commutator rotor winding which is inductive to all numbers of poles employed in the stator windings.

Other aspects of the invention will appear from consideration of the following description taken in connection with the accompanying drawings.

The drawings diagrammatically illustrate in Fig. 1 an embodiment of the invention applied to a motor; in Fig. 2 a similar embodiment of the invention applied to a generator; in Fig. 3 another embodiment of the invention applied to a motor; in Fig. 4 a further embodiment of the invention applied to a generator; in Fig. 5 a still further embodiment of the invention applied to a motor; in Fig. 6 a transformer analogous to the circuit of Fig. 5; and in Fig. 7a, b, and c a conventional arrangement of poles produced by two, four, and two and four-poles windings, respectively.

I have shown in Fig. 1 a diagrammatic representation of a motor which is supplied by a three-phase alternating-current line comprising the three phase wires 1, 2 and 3. The supply source is assumed to be 60 cycles, three-phase, but it will be obvious that the same invention could be applied to an alternating-current system of any frequency and of any number of phases. The rotor winding of the motor is a commutated winding and this rotor winding and its cooperating commutator are diagrammatically represented in the drawing by the circle 4. A set of brushes 5, 6 and 7 contacts the commutator of this rotor winding, and these three brushes have a three-phase arrangement, the brushes being positioned on the commutator 120 electrical degrees apart as hereinafter more fully explained. Three field windings 8, 9 and 10 are provided on the stator portion of the machine. The phases of these stator windings are represented as star-connected, although it will be obvious to those skilled in the art that these windings may be either star or delta-connected. The three phases of stator winding 8, which is used as a compensating winding, are connected to brushes 5, 6 and 7. The three phases of stator winding 9, which is used as a control winding, are connected to an adjustable excitation supply comprising, in the embodiment illustrated, the variable impedances 11, 12 and 13 connected to line wires 1, 2 and 3. Impedances 11, 12 and 13, may, if desired, be combined in a single gang-operated three-phase variable impedance such as a resistance. The phases of stator winding 10, which acts as a power winding, are connected directly to the line wires 1, 2 and 3 constituting the source of power.

An important feature of the embodiment of my invention shown in Fig. 1 is the fact that the various field windings are so wound that at least two of them, i. e., 9 and 10, produce a different number of poles and are noninductive to each other. The armature winding 4 is so wound, and its windings are so pitched, as to be inductive to both of the number of poles used on the stator in the power and control windings 9 and 10. Means used to make windings either noninductive or inductive to each other are well known to those skilled in the art of designing rotating electrical machinery. One manner of making a winding which will be inductive to other windings having either of two numbers of poles is disclosed in U. S. Patent 1,057,061, granted March 25, 1913, upon an application of L. J. Hunt. From the teaching of the Hunt patent and other prior art, it may be said that a winding producing poles such as those shown in Fig. 7a will be inductive only to a conventional two-pole winding and will be thought of as itself being a two-pole winding; a winding producing poles such as those shown in Fig. 7b will be inductive only to a conventional four-pole winding and will be thought of as itself being a four-pole winding; and a winding producing poles such as those shown in Fig. 7c will be inductive either to a conventional two-pole or to a conventional four-pole winding and is often called a winding arranged to produce simultaneously two and four poles.

While any other two different numbers of poles may be used, for the purpose of illustration it is assumed that power winding 10 is wound for two poles and control winding 9 is wound for four poles, as indicated by the legends 2P and 4P appearing below the respective windings in Fig. 1. These windings are noninductive to each other. Rotor winding 4 is so wound as to be inductive to both two poles and four poles. Compensating winding 8 is wound as a four-pole winding noninductive to two poles.

With the three-phase arrangement shown, brushes 5, 6 and 7 are spaced at 120 electrical degress with reference to the smaller number of poles. In the embodiment illustrated in Fig. 1 the smaller number of pairs of poles is unity and so it happens that the brushes are spaced at 120 mechanical, as well as electrical, degrees.

With the construction described, by variation of the variable impedances 11, 12 and 13, the device will operate as a variable speed motor.

The principle of operation of the motor illustrated in the embodiment of Fig. 1 may be understood if, first, it be assumed that control winding 9 is completely deenergized and power winding 10 is energized. The two-pole flux produced by winding 10 will cause voltages to be induced in rotor winding 4 and current will flow through said winding and through compensating winding 8. This current in winding 8 is not due to any transformer action directly between winding 10 and winding 8, but is due to the fact that winding 8 is closed through the brushes upon rotor winding 4. This current in winding 8 produces 4-pole ampere turns which (assuming complete compensation) exactly opposes the four-pole ampere turns produced by this same current in the rotor.

To study the operation of the machine it is first obvious that with control winding 9 deenergized, the motor will operate as an induction motor slightly below the synchronous speed of 3600 R. P. M. as a result of the two-pole 60-cycle combination. As the second step, it is assumed that, while the motor is so running, the variable impedances 11, 12 and 13 are so adjusted as to slightly excite control winding 9, so that a small amount of four-pole flux is created by the winding. This flux will cause voltages to be induced in the compensating winding 8 and in the rotor winding 4, both of which are responsive to a four-pole flux. Compensating winding 8 has the same voltage induced in it by winding 9 as has winding 4. Since these windings are closed one upon the other through the brushes, there would, at standstill and not considering for the moment the effect of power winding 10, be zero current in the combination. The motor is not at standstill, however, but is operating at nearly 3600 R. P. M. This causes a speed voltage to be produced in the combination of rotor winding 4 and compensating winding 8 by their interaction with control winding 9. This speed voltage tends to circulate, between winding 4 and 8, a current which produces a two-pole field. The same current produces no effective four-pole field as, assuming complete compensation, it only tends to produce two equal and opposite four-pole magnetomotive forces which cancel out. The speed voltage produced by the four-pole field winding 9 has the same phase sequence as the two-pole voltage induced in rotor winding 4 by the two-pole field winding, power winding 10. It is clear that the speed voltage may be made either to add to or oppose the two-pole voltage induced in rotor winding 4 by power winding 10. The machine can thus be made to slow down or speed up like any wound rotor slip-ring motor with the important difference that only very small amounts of power in the control circuit will suffice to control the output of the machine over a wide range. If it be assumed that the fields are so wound and connected that the four-pole speed voltage is substrative to the rotor voltage induced by power field 10 (i. e., the former tending to operate at 1800 R. P. M. in one direction, the latter tending to operate at 3600 R. P. M. in the opposite direction), the motor will slow down with substantial shunt characteristics as the impedances 11, 12, and 13 are cut out. The reverse is true and the motor will speed up as the control field is deenergized. Tests have indicated that only small amounts of power in control winding 9 will suffice to control the speed, the relatively large amounts of power required to drive the load being supplied almost entirely by power winding 10. For example, I have found by test that a 2 H. P. machine identical to that just described except provided with windings of four and eight poles operated satisfactorily from a normal four-pole full-load slip speed of 1720 R. P. M., with no control input, to 2800 R. P. M. with a control field input of only 2.4 amperes at 95 volts. This means that a relatively small, inexpensive and easy to operate control device may be used to perform the function of variable impedances 11, 12 and 13.

While it has been assumed that the adjustable speed motor described in connection with Fig. 1 is operated from a constant frequency supply of 60 cycles, it will be obvious that the same construction can be used to provide a motor which may be operated, by suitable adjustment, at a fairly constant speed although powered by alternating currents of variating frequency such as are often encountered in aircraft and shipboard installations. Since, in such a case, the speed is adjustably held constant, I prefer to think of the machine, when used for such an application, as still an adjustable speed motor.

I have shown in Fig. 2 a diagrammatic representation of a generator having a rotor winding 4 and stator windings 8, 9 and 10 identical with those of the motor embodiment in Fig. 1. In the generator embodiment in Fig. 2 however, there is also a mechanical connection to a driving motor 18, which is supplied by line wires 1, 2 and 3.

Power winding 10 is used to supply output phase lines 14, 15 and 16, and a reference frequency supply, such as that produced by an adjustable frequency device 17, is used to furnish excitation to control winding 9. Because of the small amount of excitation required for control winding 9, device 17 may be a relatively small device comprising any well-known arrangement of electronic, rotating or other frequency generating equipment. If desired, device 17 may be a frequency converting device supplied from phase lines 1, 2 and 3 as shown by the dotted lines in Fig. 2. The machine may be used in a number of ways among which are providing a frequency amplifier or providing adjustable frequency output to the power line comprising wires 14, 15 and 16 from a frequency source such as phase lines 1, 2 and 3 which may be either constant or variating. If the frequency of lines 1, 2 and 3 is variating it may be desirable to provide an adjustably constant frequency output at the lines 14, 15 and 16.

Operation of the generator may be explained by taking the single case where it is assumed that lines 1, 2 and 3 provide a constant frequency, such as 60-cycle, supply and the generator is driven at substantially constant speed by motor 18. With 3-phase power supplied to control winding 9 a four-pole flux is produced which circulates current in the combination of compensating winding 8 and rotor winding 4 due to the speed voltage produced in said combination as the machine is driven at constant speed by motor 18. This circulating current produces a two-pole flux which links with power winding 10. In turn a speed voltage is produced in the combination of power winding 10 and rotor winding 4, resulting in amplification of excitation to output.

I have shown in Fig. 3 a diagrammatic representation of a motor similar to that shown in Fig. 1, except that it is provided with a method of reversing the excitation voltage 180 degrees, so that the excitation may be either subtractive, as described in connection with Fig. 1, or additive. Thus speeds both below and above zero excitation speed may be obtained. For example, a speed range of 2000 R. P. M. to 5000 R. P. M. may be obtained although the 60-cycle supply with the power winding alone would only provide a synchronous speed of 3600 R. P. M. Like numbered parts are the same in Fig. 3 as in Fig. 1, except that control winding 9a is connected in open star with the respective ends of each phase connected to the midpoint and to a variable point on each phase of a star-connected variable three-phase impedance 19. With such connections, the motor indicated in Fig. 3 will operate slightly below 3600 R. P. M. when the variable taps are placed on the midpoints of the phases of variable impedance 19, and will operate above or below this speed as the taps are moved in one direction or the other.

Of course with only slight modifications, such as those distinguishing Fig. 2 from Fig. 1, the embodiment illustrated in Fig. 3 could be applied to a generator.

In Fig. 4 I have shown a diagrammatic representation of a generator which, it is assumed, is being driven at substantially constant speed by some source of mechanically-coupled power such as an engine or an electric motor (not shown). Three-phase 60-cycle lines 1, 2 and 3 are used initially to excite control winding 9 through the three-phase exciting switch 20. After a short initial period of this excitation, switch 20 may be opened and the machine self-excited, control winding 9 then being excited through variable impedances 11, 12 and 13. The commutator of rotor winding 4 is provided with three brushes 5, 6 and 7 spaced at 120 electrical degrees and connected to compensating winding 8, as before. Power winding 10 is in open star and the outer ends of its phases are connected to the three-phase wires 21, 22 and 23 which carry the output of the machine. The inner ends of the three phases of power winding 10 are connected to an additional set of commutator brushes 24, 25 and 26 which are located on the commutator midway between brushes 5, 6 and 7. It is assumed that the generator is being driven at constant speed and it is desired to vary the output frequency. Such would be the case if output wires 21, 22 and 23 were employed to feed power to a plurality of small squirrel-cage induction motors (not shown) the speeds of all of which are to be changed simultaneously, such as for the operation of the individual rolls of a steel mill runout table.

The polyphase power initially supplied, from the line comprising wires 1, 2 and 3, to control winding 9, produces a four-pole flux which circulates current in the combination of compensating winding 8 and rotor winding 4 due to the speed voltage produced in said combination as the machine is driven at constant speed. This current circulating in windings 8 and 4 produces a two-pole field in the rotor winding 4. Power winding 10 is so designed that any current flowing from winding 4 through winding 10 produces a two-pole magnetomotive force which is equal and opposite to the two-pole magnetomotive force set up by this current in winding 4. There will, therefore, be no change in two-pole flux when load is applied to winding 10. Since winding 10 is opposing winding 4, only a speed voltage is produced by this combination and this voltage appears at lines 21, 22 and 23. The frequency of this output may be changed by manipulation of impedances 11, 12 and 13 which, preferably, are connected in gang so as to be varied together. Additional advantages of this embodiment over that shown in Fig. 2 are that a separate variable frequency source (such as 17 in Fig. 2) need not be furnished and that output frequency and voltage are independent of load.

Because of the double amplification feature of the embodiment indicated by Fig. 4, only very small control currents will suffice to vary suitably the frequency of large amount of power. Similarly, a motor can be provided with very sensitive speed control by any means of regeneration such as using a second set of brushes connecting the rotor in series with the power winding as shown in the generator embodiment of Fig. 4.

In Fig. 5 I have shown a diagrammatic representation of another embodiment of my invention suitable for motor operation. A three-phase 60-cycle source is assumed applied to phase wires 1, 2 and 3 to energize power winding 27 and, through the variable impedances 11, 12 and 13 to energize control winding 9b. Power winding 27 is wound for both four poles and eight poles and control winding 9b is wound only for eight poles and is noninductive to four poles. The rotor winding 4a is inductive to both four poles and eight poles and is provided with a set of brushes 28, 29, 30, 31, 32 and 33. The brushes are spaced 120 electrical degrees apart, relative to the smaller number of poles, so that in this particular embodiment six brushes are employed. The winding 4a is short-circuited through brushes 28 to 33 which are connected to a stationary short-circuiting ring 34.

It will be observed that with the embodiment illustrated in Fig. 5 the rotor and stator are inductively coupled both by the 8-pole turns and by the 4-pole turns. By varying the voltage supplied to control winding 9b through the variable impedances the four-pole field produced by winding 9b may be changed and this in turn changes the net voltage induced in the rotor and controls the speed of operation of the motor. This embodiment of my invention has two important advantages in that the compensating winding is eliminated and that a greater speed range, with even less control power, will be obtainable than with, for example, the embodiment of Fig. 3. Perhaps the principle of operation of the embodiment of Fig. 5 can best be understood by the following analogy: Since the rotor and stator are inductively coupled both by four-pole turns and eight-pole turns, the condition may be thought of as similar to two transformers whose primaries are in series and whose secondaries are in series as shown in Fig. 6. The voltage drop $V_1$, which is the voltage impressed on power winding 27, divides up according to the respective magnetizing reactances of the 4-pole and 8-pole components in winding 27. The rotor voltage $V_2$ also divides up according to the respective magnetizing reactances of the 4-pole and 8-pole components in rotor winding 4a. Control winding 9b acts as a tertiary winding applied to one of the two transformers of Fig. 6, and by applying excitation current to it the voltage drop across that transformer can be altered. The total voltage drop $V_1$ remains the same so that as the drop across one transformer (i. e., across, for example, the transformer analogous to the 8P windings) is decreased, the drop across the other (i. e., that analogous to the 4P windings) is increased, affecting the speed of the machine of Fig. 5 when it is used as a motor, or the frequency when it is used as a generator, in a manner similar to that achieved with the other embodiments.

There is no reason for limiting the number of poles of the windings to the numbers thus far mentioned. The machines indicated in Figs. 1, 2, 3, 4 and 5 would, for example, work equally well if winding 10 were a 4-pole winding and windings 9 and 8 were 12-pole windings, winding 4 being inductive to both. With the example given, however, harmonics would have to be considered, brush spacing changed and it may be desirable to change the number of phases in one winding.

If desired, single phase excitation may be used on a polyphase machine so that a single-phase variable rheostat will suffice, or the invention may be applied to a single-phase machine if any one of many well-known phase-splitting methods are used to develop a rotating field.

If desired, commutator windings of the interpole type may be added. It is often found, however, that the use of commutating windings is prohibited by using brushes which are adjustable over a range and in carrying out my invention I prefer to use brushes which, although they are stationary during normal operation, are annularly adjustable so that at the time of initial operation the phase angle between current in the effective turns of the rotor winding and current in the stator windings may be adjusted to give the most desirable results.

It is apparent from the above description of various embodiments of my invention that there is thus provided a device capable of meeting a part of the present great demand for a simple adjustable-speed alternating-current motor. At the same time there is provided a generator capable of acting as a frequency amplifier, and a machine capable of acting as an adjustable frequency generator. While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. In a dynamoelectric machine adapted to operate from an alternating current line and having a stator, a rotor, a commutator and commutator brushes therefor, the combination of a winding on said rotor connected to said commutator and arranged to be inductive to at least two different numbers of stator poles, a winding arranged on said stator to produce at least one of said different numbers of poles, another winding on said stator arranged to produce another of said different numbers of poles, means for supplying excitation to one of said stator windings, means for simultaneously providing a substantially direct connection between said line and the other of said stator windings, and means for externally completing a circuit between said commutator brushes.

2. A dynamoelectric machine of the commutator type adapted to be connected to an alternating current line, a commutated rotor winding on said machine arranged to be inductive to two different numbers of poles, commutator brushes cooperating with said rotor winding, means for externally completing a circuit between said commutator brushes, a stator winding on said machine arranged to produce one of said different numbers of poles when directly connected to said line, a stator winding on said machine arranged to produce another of said different numbers of poles, and adjustable means for supplying excitation to said second stator winding, whereby the characteristics of said dynamoelectric machine may be adjustably varied.

3. An alternating current motor having a rotor core portion and a stator core portion, said stator core portion provided with three stator windings, two of said windings being arranged to produce the same number of poles, the third of said stator windings being arranged to produce a different number of poles, said rotor core portion provided with a commutated rotor winding inductive to all numbers of poles produced by said stator windings, commutator brushes, means including connections from said commutator brushes to one of said two stator windings arranged to produce the same number of poles to complete a circuit with said rotor winding and to cause said stator winding to function as a compensating winding, means including an adjustable supply of excitation for the other of said two stator windings producing the same number of poles to cause said stator winding to function as a control winding, and means for energizing said third stator winding with a substantially constant supply of power to cause it to function as a power winding, whereby said motor may be operated as an adjustable speed motor.

4. A polyphase alternating current motor having a stator and a rotor, a winding on said stator adapted for operation as a power winding and inductive to a single number of poles, a winding on said stator adapted to operate as a control winding and inductive to a different number of poles, a third winding on said stator, a winding on said rotor inductive to all numbers of poles employed in said stator windings, a commutator attached to said rotor winding, brushes contacting said commutator, means including connections from said brushes to said third-mentioned stator winding to adapt it to operate as a compensating winding, whereby said motor may be operated as an adjustable speed motor.

5. An alternating current motor having a stator and a rotor, said rotor having a commutated rotor winding arranged to produce two different numbers of poles, commutator brushes, means for short-circuiting said rotor winding through said brushes, a stator winding arranged to produce the same two numbers of poles as said rotor winding and adapted to operate as a power winding, a stator winding arranged to produce only one of said two numbers of poles and adapted to operate as a control winding, and means for adjustably energizing said last-mentioned stator winding, whereby said motor may be operated as an adjustable speed motor.

6. An alternating current motor having a stator and a rotor, said rotor provided with a commutated rotor winding arranged to be inductive to two different numbers of poles, brushes contacting said commutator, means for interconnecting said brushes, a stator winding arranged to produce a single number of poles and adapted to be directly connected to a line to operate as a power winding, a stator winding arranged to provide a different number of poles and adapted to be connected to an adjustable excitation source including an adjustable impedance having a midpoint and an adjustable connection point to cause said second stator winding to act as a control winding, and means including interconnections from said control stator winding to said midpoint and to said adjustable connection point on said impedance to adapt said stator control winding selectively to buck and boost voltage produced in said rotor by said power stator winding according to positioning of said adjustable connection point above and below the midpoint on said impedance.

7. An alternating current generator adapted to be driven by an external source of mechanical power and having a stator portion and a rotor portion, said rotor portion being provided with a commutated rotor winding arranged to be inductive to two different numbers of poles, commutator brushes for said rotor winding, means for providing an external connection between said brushes, said stator being provided with a stator winding arranged to produce only one of said different numbers of poles, said stator winding being adapted to be excited from a reference frequency supply of excitation, and said stator provided with another stator winding, said other stator winding arranged to produce only the other of said different numbers of poles and being adapted to be connected to an output line from said machine.

8. An alternating current generator adapted to be driven by an outside source of mechanical power and having a stator portion and a rotor portion, said rotor portion being provided with a commutator and a commutated rotor winding arranged to produce two different numbers of poles, brushes contacting the commutator of said winding, a stator winding arranged to produce one of said different numbers of poles and connected to said commutator brushes to function as a compensating winding, another stator winding arranged to produce the other of said different numbers of poles and connected to a line adapted to carry the output of said machine whereby said stator winding acts as a power winding, a third stator winding arranged to produce the same number of poles as said first-mentioned stator winding, means for selectively connecting said third-mentioned stator winding to an outside source of excitation for initial excitation of said machine and through an adjustable impedance means to said output line for self excitation of said machine, whereby the frequency of said output line may be adjusted by adjusting said adjustable impedance means with a high ratio of power winding output to control winding input.

9. In an alternating current generator having a commutated rotor winding and commutator brushes therefor, said rotor winding arranged to produce two different numbers of poles, a stator compensating winding arranged to produce one of said different numbers of poles and connected to said commutator brushes to complete said rotor winding circuit, a stator power winding arranged to produce the other of said different numbers of poles and connected to an output line, a stator control winding arranged to produce the same number of poles as said compensating winding and connected to an adjustable supply of excitation, whereby because of the net inductive effect produced by said windings due to their magnetic and electric relationships, the output of said machine may be controlled with a high ratio of output to excitation input.

10. A polyphase alternating current motor having a stator and a rotor, said rotor provided with a winding having a commutator, commutator brushes for said commutator, and a plurality of windings on said stator, one of said stator windings adapted to be arranged conductively in circuit with a power line, one of said stator windings adapted to be arranged conductively in circuit with a source of control voltage and one of said stator windings arranged in circuit with said commutator brushes, whereby the windings of said combination may be inductively arranged so that said first-mentioned stator winding due to the net inductive effect which it has on the combination may act as a power winding, said second-mentioned stator winding due to the net inductive effect which it has on the combination may act as a control winding, and said third-mentioned stator winding due to the net inductive effect which it has on the combination may act as a compensating winding, and whereby said motor may be operated as an adjustable speed motor with a high amplification ratio of output to control excitation input.

FREDERICK W. BAUMANN.

REFERENCES CITED

The following references are of record in the file of this patent:

UNITED STATES PATENTS

| Number | Name | Date |
| --- | --- | --- |
| 1,057,061 | Hunt | Mar. 25, 1913 |